May 8, 1956 JEFFREY C. CHU ET AL 2,745,006

BINARY COUNTER

Filed Aug. 18, 1952 2 Sheets-Sheet 1

INVENTORS
Jeffrey C. Chu &
BY David H. Jacobsohn

Roland A. Anderson

ATTORNEY

May 8, 1956 JEFFREY C. CHU ET AL 2,745,006

BINARY COUNTER

Filed Aug. 18, 1952 2 Sheets-Sheet 2

INVENTORS
Jeffrey C. Chu &
BY David H. Jacobsohn

Roland A. Anderson
ATTORNEY

United States Patent Office 2,745,006

Patented May 8, 1956

2,745,006

BINARY COUNTER

Jeffrey C. Chu, Naperville, and David H. Jacobsohn, Chicago, Ill., assignors to the United States of America as represented by the United States Atomic Energy Commission Application August 18, 1952, Serial No. 305,056

6 Claims. (Cl. 250—27)

The present invention relates to electronic counters, and more especially to a novel decoding-type counter, especially adapted for very fast operation in electronic computers and the like.

Electronic counters of the prior art may be divided into two general classifications: the scaler, and the adder. In the scaler, the condition of any flip-flop unit or toggle in the chain depends upon the transition of the preceding toggle from one stable stage to the other. For some operations, it would be necessary to wait from the time an input pulse is applied to the first stage until each successive toggle changed state before information could be extracted safely. It is apparent that a time lag, or carry time, equal to the transition time of one stage times the number of stages must be allowed between operations to insure complete reliability. Moreover, the scaler requires two tubes for each binary stage, so that ten tubes would be required for a scale-of-32 counter, for example. In the adder type counter, the previous total count is maintained in a series of registers or storage toggles, and a 1 is added to the least significant digit in order to add to the total count. While the adder type counter requires fewer tubes, it is quite slow in operation because all carries resulting from a single count must be completed throughout the system before the next count can be applied to the input. In a computer utilizing as many as 40 binary stages, propagation of the carry through 40 adder stages would require an undesirable long time interval and slow operation of the entire computing machine.

Accordingly, it is the primary object of our invention to shorten the time required for operation of a binary counter.

Another object of our invention is to provide a novel counter wherein there is substantially zero delay due to propagation of carries through successive stages.

A further object is to provide a counter especially adapted for use with an electrostatic memory in computing machines.

Other objects and advantages of our invention will become apparent from the following detailed description of a preferred embodiment thereof, when read in connection with the appended drawings in which.

We have provided a binary counter including a set of binary responsive storage toggles in which the result of a preceding count is held, a chain of transfer gates to examine each of these toggles, and at least one set of binary responsive counting toggles, the state of which toggles may be changed in response to the examination of the storage toggles by the gates and incidence of a counting pulse. The chain of transfer gates above mentioned operate as a decoding function table of all the previous stages to determine instantaneously the correct setting of each respective stage, without waiting for a series of pulses or transformations to pass through the entire counter unit.

Figure 1:
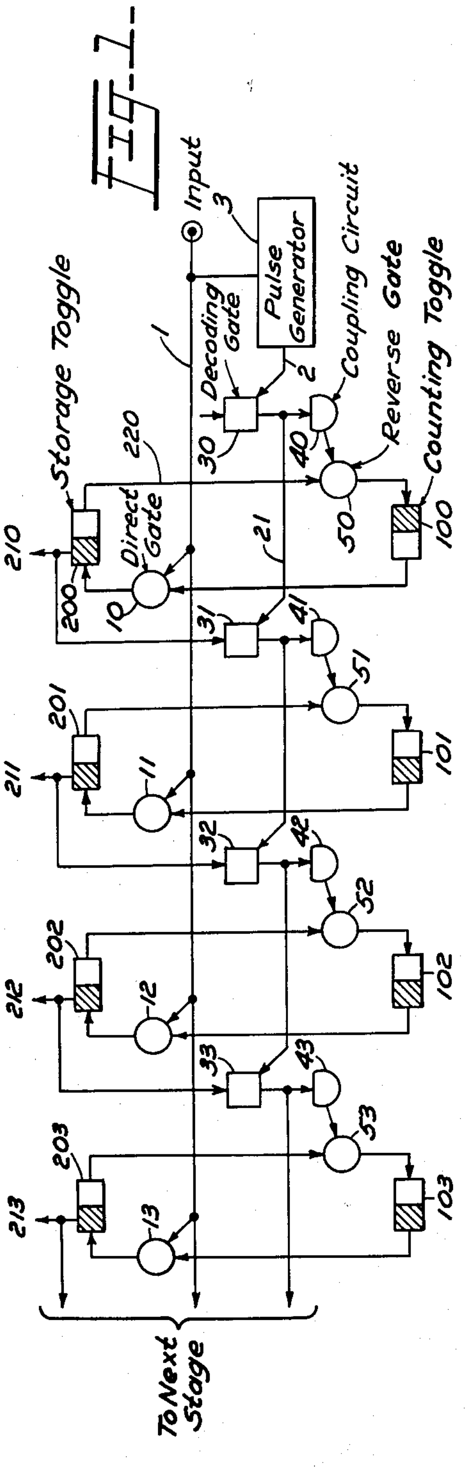
Figure 1 is a block diagram of a counter constructed according to the principles of our invention.

Referring now to Figure 1, four stages of a counter are shown in logical representation. The blocks 100—103 and 200—203 represent binary responsive devices, or toggles, which may be electrically represented by a symmetrical trigger pair or other bistable circuit. A single stage of the counter comprises a storage toggle, represented by the upper block 200 in the figure, a counting toggle, represented by the lower block 100, a direct transfer means 10, a reverse transfer means 50, a decoding transfer means 30, and a coupling circuit 40. Each stage is identical, and is coupled to the preceding stage through two inputs to the decoding transfer gate: one input comes from the output of the decoding gate of the prior stage while the other input comes from the storage toggle of the prior stage. A common lead 1 receives the pulses to be counted and connects with each of the direct transfer gates 10—13. The first stage decoding gate 30 receives a reference voltage at one input and a series of pulses, each pulse immediately following in time a corresponding pulse on lead 1, on the input lead 2, connected to pulse generator 3. The generator may be of any conventional design adapted to be triggered by the presence of a pulse on line 1 and to produce a corresponding pulse, delayed for a fixed time interval by a delay line or other suitable means.

The gates are the coincidence type, logical "and" gates, and may for convenience be operable on receipt of two negative signals. One signal may be in the form of a pulse: direct transfer gate 10 operates only on receipt of a negative pulse on lead 1, reverse transfer gate 50 requires a negative pulse from coupling circuit 40, and decoding gate 30 is operative only when it receives a negative pulse on lead 2. The second signal may be a voltage level of predetermined value: the direct transfer gates derive their signals from the counting toggles, the reverse transfer gates from the storage toggles, and the decoding gates from the output of the preceding decoding gate.

Initially, all toggles are cleared to the 0 position except toggle 100, which is set to indicate 1. A negative input pulse is applied to line 1 to energize all the direct transfer gates 10—13, transferring the contents of each of the counting toggles to the storage toggles. Therefore, toggle 200 will register a 1. A negative input pulse is next impressed upon line 2. Whether the reverse transfer gate associated with any stage will open or not depends upon condition of the two inputs to the decoding gate of that stage: the storage toggle of the preceding stage must contain a 1 to energize that input, and the decoding gate of the next preceding stage must be energized to provide a negative pulse to the second input. The counter output is taken from the storage toggles on appropriate leads 210—213, which indicate by their voltage level, the state of the toggle. It is apparent that counting is accomplished, so far as the outputs are concerned, as soon as line 1 is energized, the time constants of the direct transfer gate themselves being the only speed limitation. Since the only limitation on the counting rate is the inherent time constants of these circuits, it may be said that this counter has zero carrying time.

To further illustrate operation of the counter, suppose, for example, that the storage toggles are set to 0000, while the counting toggles read 0001. If then a suitable pulse is introduced on line 1, all the gate circuits 10—13 are placed in position to allow the contents of the respective toggles 100—103 to be conveyed to the toggles 200—203, so that the latter will take up a circuit condition exactly corresponding to the former without modifying the counting group in any way. Therefore, a pulse on line 1 would change the state of toggle 200 to a 1, all other stages remaining unchanged. The output of the toggles 200—203 would be immediately available for use elsewhere in the computer.

If following the pulse on line 1 a pulse appears on lead 2, it will be transferred to the output of gate 30, coupled through circuit 40, and transferred through gate 50, which is "open" because of the voltage level on lead 220, to flip toggle 100 from 1 to 0. The pulse will also be transferred along lead 21 to gate 31 in the second binary stage. That gate will admit the pulse to the second stage only if toggle 200 registers 1. If that toggle registers 0, no binary carry is desired, so gate 31 is blocked by the voltage level on lead 210, and no pulse enters the second toggle 101. In the example above given, the pulse will be allowed to enter stage 101, so that the counting toggles will register 0010, while the storage toggles remain at 0001.

A second pulse on line 1 again transfers the contents of the counting toggles to the storage unit. A second pulse on line 2 will then enter stage 100, flipping it to 1, because stage 200 registers 0 and its associated gate 50 is "open." The voltage level on lead 210 "closes" gate 31, blocking the pulse on line 21 from stage 101. A third set of pulses on lines 1, 2 will change the counting toggles of the first two stages back to 0 and set stage 102 to register 1, leaving the storage toggles registering 0011. It is apparent that further inputs to be counted will effect similar results over any number of binary stages, four stages being shown only by way of illustration of the principles of our invention.

Figure 2:
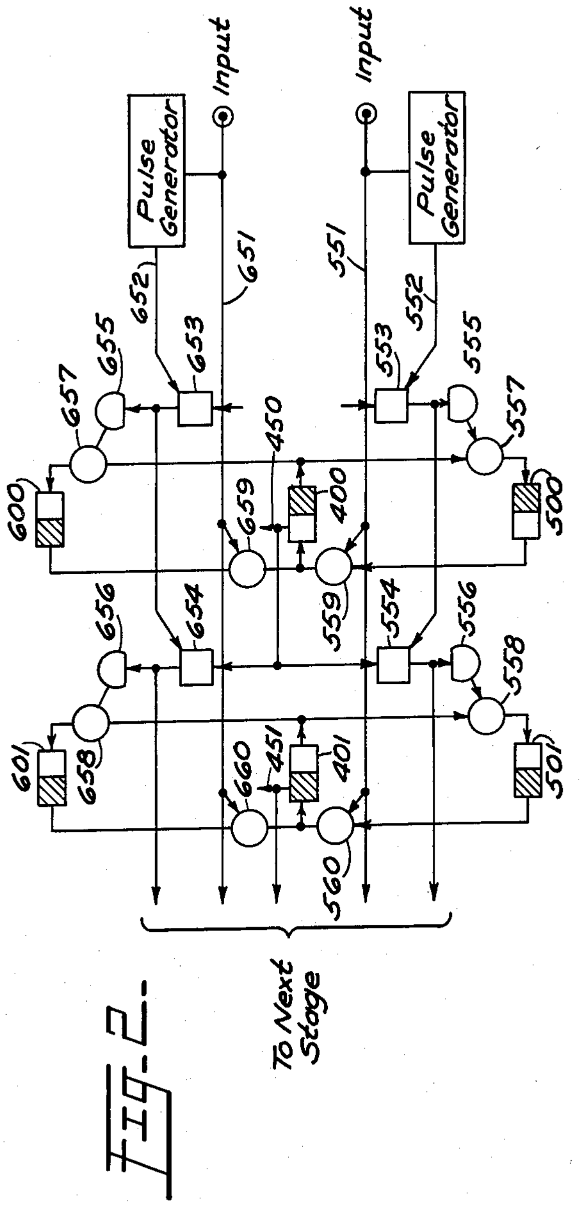
Figure 2 is a block diagram of a dual counter designed according to the principles of our invention.

For certain applications it may be desirable to remember two separate counts simultaneously, and to select either output at will. The counter shown in Figure 2 satisfies the above requirements. It is provided with a common bank of storage toggles 400, 401, etc., and two banks of counting toggles 500, 501, etc., and 600, 601. Output connections may be taken from the storage toggles on leads 450, 451, as in the single counter of Figure 1. The contents of either bank of counting toggles may be transferred to the storage toggles by a pulse on the associated line 551 or 651 after the latter toggles are cleared to 0 and then transferred back to the counting toggles with the addition of one by a pulse on line 552 or 652. The storage toggles must then be cleared to receive the next set of information from the counting toggles, as by application of a suitable voltage signal to leads 450, 451, to flip the toggles to 0. Alternatively, and with greater speed, information may be transferred into the storage toggles without first clearing them by means of special double gates illustrated in Figure 3. It is apparent that the output signal from leads 450, 451 will indicate the information last transferred into toggles 400, 401 from the counting toggles. Such an arrangement is useful in controlling the deflection circuits in an electrostatic memory system, where the beam position must obey either of two commands; a control counter directing the sequence operations, or a regeneration counter, which directs the rewriting of information stored on the memory at periodic intervals. Since no appreciable carry time or waiting time is involved, information from the selected one of the counting toggles may be gated into the storage toggles and the output signal derived to control the beam position by simply pulsing the one of the two lines 651, 551 associated with the counting toggle from which the information is desired.

The decoding gates are numbered 653, 654, 553 and 554; the direct gates are 659, 660, 559, and 560; the reverse gates are indicated 657, 658, 557, and 558; and the coupling circuits are represented by blocks 655, 656, 555, and 556.

In the counters above described, the toggles may comprise conventional symmetrical flip-flop or trigger pair circuits having a common cathode and having the plate of one tube of the pair coupled through a resistance to the grid of the opposite tube. The resistor grid transfer gates provided may be operated by negative pulse on the cathode of a tube normally cut off, the pulse lowering the cathode voltage below the grid voltage so that conduction results, dropping the plate voltage of the tube. This plate voltage may be coupled to one grid of the associated trigger pair to provide the necessary signal for tripping the toggle. The decoding gates may comprise a cathode-coupled pair of triode tubes wherein the two inputs are impressed upon the respective control elements and the output is derived from the cathode.

Figure 3:
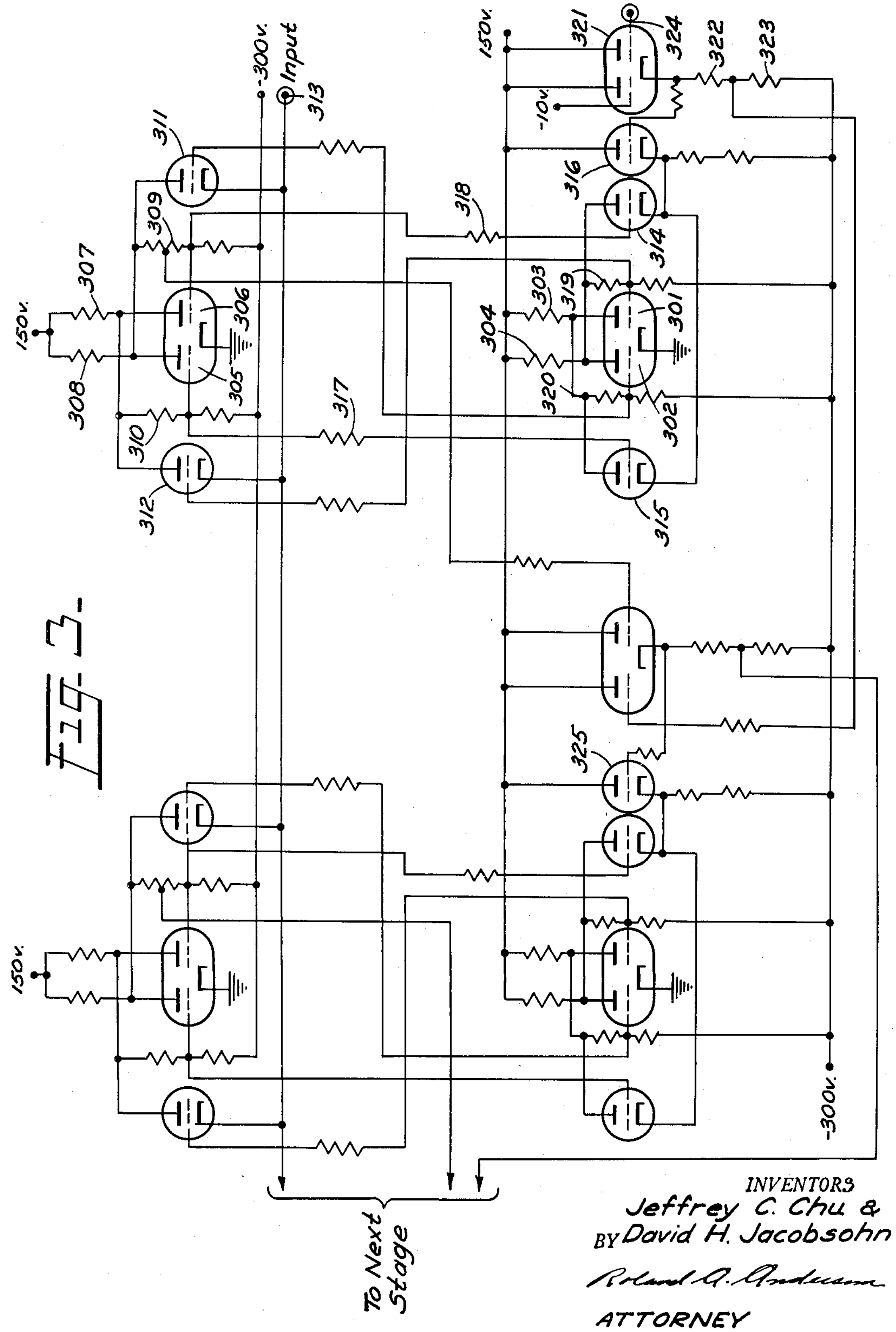
Figure 3 is a schematic circuit diagram corresponding to the block diagram of Figure 1.

Referring now to Figure 3, two stages of a multi-stage binary counter are schematically represented. The counting toggle of the first stage may comprise tubes 301, 302 connected through suitable plate resistors 303, 304 to a source of energizing voltage, indicated +150, and having a common grounded cathode. Each anode is cross-connected through a resistor voltage divider to the opposite grid and a source of bias voltage, indicated −300. The storage toggle of the first stage is identical to the counting toggle, and includes tubes 305, 306, plate resistors 307, 308 and voltage dividers 309, 310.

The direct transfer gates may be double gates, comprising triodes 311, 312, both cathode-coupled to lead 313 for receiving the counting impulses previously mentioned as incident on lead 1, Figure 1. These pulses may be negative square waves going from +10 to −10 volts, for example. The anode of gate tube 311 is coupled to divider 309, while the anode of gate tube 312 is coupled to divider 310. The reverse transfer gates may also be double gates, comprising triodes 314, 315, both cathode-coupled to cathode follower 316. The grid of tube 315 is coupled through resistor 317 to divider 310, while the grid of tube 314 is coupled through resistor 318 to divider 309. The anodes of tubes 314, 315 are connected to voltage dividers 319, 320, respectively.

The decoding gate comprises duo-triode 321, having a common cathode connected through resistors 322, 323 to a source of negative voltage indicated −300. In the first stage, one grid is connected to lead 324 to receive the input pulses previously mentioned as occurring after each pulse to the direct transfer gates, while the other grid is coupled to a fixed source of voltage of −10 volts, for example. In the second and all succeeding stages, the first grid is coupled back to a voltage divider in the preceding stage storage toggle, while the second grid is coupled to the junction of the cathode resistors of the preceding stage decoding gate.

The coupling tube 316 may be simply a cathode-follower, having its control grid coupled to the cathode of the decoding gate and its cathode coupled to the reverse transfer gates 314, 315.

Tube type 6J6 may preferably be employed for all tubes shown except the coupling cathode-followers 316, 325, 326, etc., which may be one half of the duo-triode type 5670.

We claim:

1. An electric impulse counter comprising an input for receiving pulses to be counted, means for deriving a control pulse corresponding to each input pulse but delayed in time, and at least two concatenated stages, each stage comprising: first and second binary responsive members, a first transfer means responsive to pulses at said input connecting said first and second members in response to electrical impulses impressed upon said input, whereby the binary state of the first member may be transferred to the second member, a second transfer means connecting said members whereby the binary state of said second member may be transferred to said first member upon receipt of said control pulse, and third transfer means coupled to said second transfer means; said third means in all stages except the first being coupled to and adapted to be energized by only one binary state of the second member of the next preceding stage and being further coupled to the third transfer means in said next preceding stage to receive control pulses propagated therethrough, and in said first stage being coupled to a source of reference potential and to said control pulse deriving means; whereby a control pulse is propagated through successive stages to transfer the states of said second binary members of said stages to said first binary members until said pulse is blocked by an unenergized third transfer means.

2. A device according to claim 1 wherein said binary responsive members comprise a symmetrical trigger pair and said transfer means comprise a gating circuit having two control inputs and at least one output, corresponding signals at said two inputs being required to energize said circuit.

3. The device of claim 1 wherein said binary responsive members comprise first and second electron tubes each having anode, cathode and control elements, a common cathode connection, resistance means coupling each of said anodes to the control electrode of the opposite tube, and respective resistance means associated with each of said anodes.

4. The device of claim 1 wherein said binary responsive members comprise first and second electron tubes each having anode, cathode and control elements, a common cathode connection, resistance means coupling each of said anodes to the control electrode of the opposite tube, and respective resistance means associated with each of said anodes; and said first transfer means comprises third and fourth electron discharge tubes having at least anode, cathode and control elements, said cathodes being coupled to said input to receive negative pulses to be counted, said anodes being coupled to the anodes of the corresponding tubes of said second member, the control elements of said pair of tubes being coupled to the control elements of the corresponding tubes of said first member; said second transfer means comprises fifth and sixth electron discharge tubes having anode, cathode and control electrodes, said cathodes being coupled together, said control elements being coupled to the control elements of opposite tubes of said first member, and said anodes being coupled to the anodes of the corresponding tubes of said first member; said third transfer means comprises seventh, eighth, and ninth electron discharge tubes having anode, cathode, and control elements, the cathodes of said seventh and eighth tubes being coupled together and to the control element of said ninth tube, the cathode of said ninth tube being coupled to the cathodes of said fifth and sixth tubes, said control elements of the seventh and eighth tubes in all stages except the first being coupled, respectively, to said resistance means of said second member in the preceding stage and to the cathodes of said seventh and eighth tubes of the preceding stage, said control elements in said first stage being coupled, respectively, to a reference potential and to said control pulse deriving means.

5. A dual counter comprising first and second inputs for receiving pulses to be counted, first and second means for deriving a control pulse corresponding to each input pulse but delayed in time, and at least two concatenated stages, each stage comprising: first, second, and third binary responsive members; a first transfer means responsive to pulses at said first input coupling said first and second members a second transfer means responsive to pulses at said second input coupling said second and third members, whereby the binary state of either said first and third member may be transferred to said second member in response to a pulse at the appropriate input; a third transfer means coupling said first and second members, a fourth transfer means coupling said second and third members, said third and fourth means being energized by control pulses from said first and second deriving means, respectively, for transferring the binary state of said second member to said first or said third member in accordance with the pulse deriving means actuated; and fifth and sixth transfer means coupled respectively to said third and fourth transfer means, said fifth and sixth means associated with said first stage being coupled respectively to said first and second pulse deriving means, said fifth and sixth means associated with all succeeding stages being coupled to and energized by one state of said second member of the next preceding stage, and being further coupled respectively, to said fifth and sixth means in the next preceding stage, to receive control pulses propagated therethrough if said means in said preceding stage be energized.

6. An electrical impulse counter comprising an input circuit for receiving impulses; a plurality of binary stages each being provided with first and second binary toggles; means associated with each stage responsive to receipt of an impulse on said input circuit for setting respective first toggles to correspond to the state of corresponding second toggles; means responsive to receipt of said impulses for generating corresponding control pulses; concatenated transfer means associated with each stage responsive to the binary state of the first toggle of each preceding stage for transmitting said control pulses along the concatenated transfer means; and means associated with each stage responsive to the binary state of the first toggle of that stage for further transmitting control pulses to respective second toggles from said transfer means.

References Cited in the file of this patent

UNITED STATES PATENTS

| | | |
|---|---|---|
| 2,404,047 | Flory et al. | July 16, 1946 |
| 2,435,840 | Morton | Feb. 10, 1948 |
| 2,596,741 | Tyler et al. | May 13, 1952 |